Figure 1:
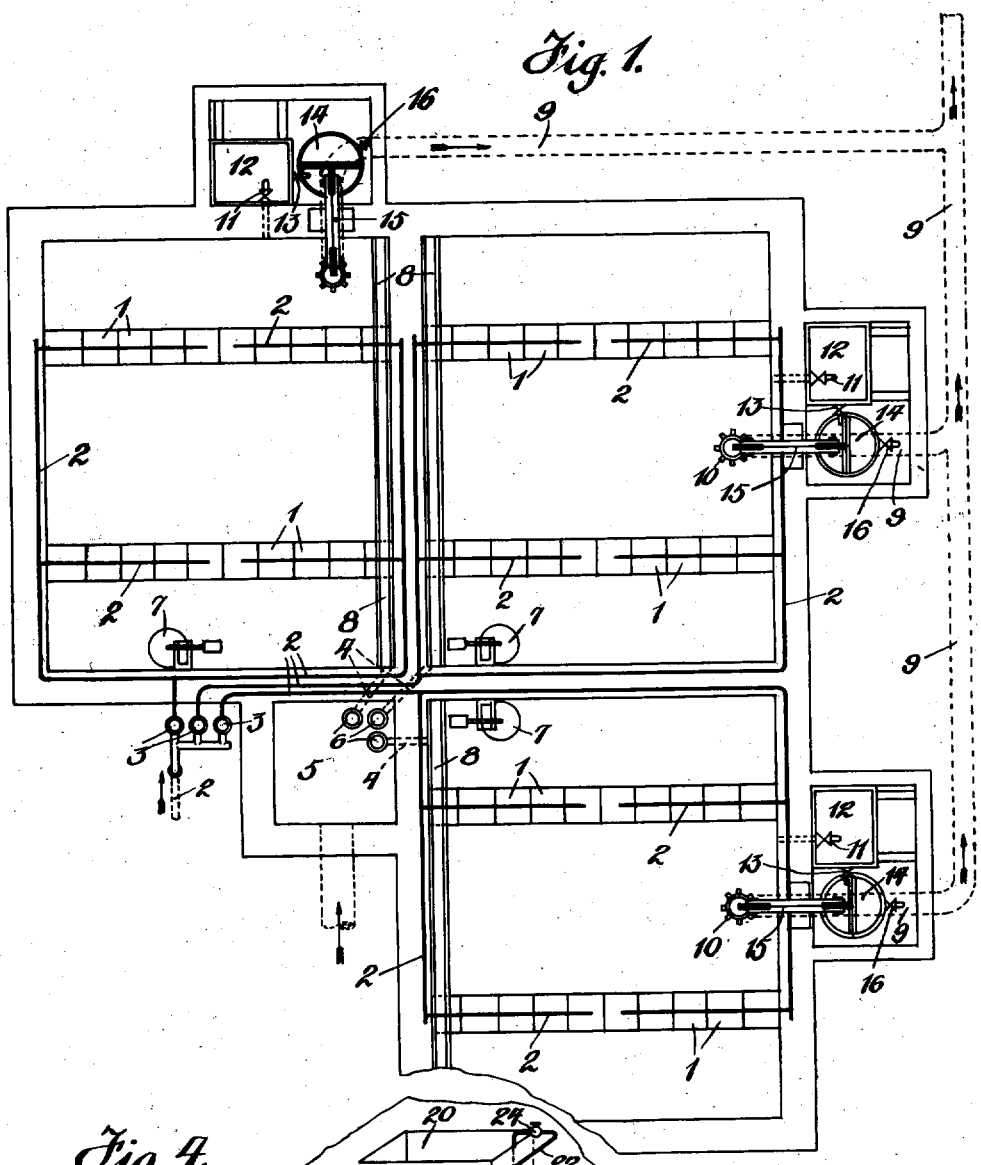

W. JONES.

PURIFICATION OF SEWAGE AND ANALOGOUS LIQUIDS.

APPLICATION FILED AUG. 11, 1919.

Reissued July 5, 1921.

15,140.

2 SHEETS—SHEET 1.

Inventor

W. Jones.

By

Attorney

W. JONES.

PURIFICATION OF SEWAGE AND ANALOGOUS LIQUIDS.

APPLICATION FILED AUG. 11, 1919.

Reissued July 5, 1921. 15,140.

2 SHEETS—SHEET 2.

Inventor

W. Jones.

By [signature]

Attorney

UNITED STATES PATENT OFFICE.

WALTER JONES, OF STOURBRIDGE, ENGLAND.

PURIFICATION OF SEWAGE AND ANALOGOUS LIQUIDS.

15,140. Specification of Reissued Letters Patent. Reissued July 5, 1921.

Original No. 1,247,543, dated November 20, 1917, Serial No. 56,537, filed October 18, 1915. Application for reissue filed August 11, 1919. Serial No. 316,875.

*To all whom it may concern:*

Be it known that I, WALTER JONES, a subject of the King of England, residing at Stourbridge, in the county of Worcester, England, have invented new and useful Improvements in and Connected with the Purification of Sewage and Analogous Liquids, of which the following is a specification.

This invention has reference to systems of purifying sewage and analogous impure liquids, in which the purification is effected by the action of ærobic bacteria, or other similar forms of germ life, upon the sewage or liquid; and it relates moreover, mainly to such systems wherein the sewage or liquid to be purified is introduced into a tank or vessel, and is together with sludge containing the bacteria or germ life (and generally a large proportion of sludge, say 20% to 30%) subjected to the action of air delivered into it in small bubbles, such as those produced by forcing air through a porous stone or other air diffusing body.

The objects and effects of the present invention are generally to provide improvements in connection with systems of sewage or analogous liquid purification systems of the kind referred to, and the plant used by which process of purification can not only be carried out at a high rate, but it can be effected more uniformly, and the conditions necessary for obtaining best results or effects more easily obtained and preserved; and also generally to provide a construction and mode of operation which is convenient, easily worked, and advantageous.

In a system of purification of sewage and analogous liquids according to this invention, say at starting, the tank will contain a quantity of sludge in cultivated state, containing bacteria of the necessary species in a high degree of purifying activity and effect. The tank is gradually and quietly filled with fresh sewage, and while it is being so filled, air is supplied to the contents at the bottom at various points, and preferably in the form of fine or minute bubbles properly distributed or diffused, so as to act on the sludge life, and on the liquid, as it comes in, and distribute the bacteria uniformly throughout the mass. The gradual fillings of the tank may be distributed over several hours, say, one to six hours.

When the tank is full, the contents having been acted upon all the time during the filling by the air, the process of the breaking down of the impurities, and nitrification of the sludge will have been accomplished.

The supply both of liquid and air are then stopped, and the contents of the tank will remain quiescent for a period, say about one hour to two hours; and after a time of quiescent precipitation of the sludge and solid matters, purified water at or near the surface will be gradually decanted or drawn off; the whole drawing off operation taking say about half an hour.

In some cases, a plurality of tanks are employed, and are arranged to work in sequence, as hereinafter described, so that there will be a continuous flow of sewage or liquid into the system, and out of it. The method of treatment may be carried out as follows:—

When one tank is full, the second tank will be nearly full (say it will be full one hour later), and so on; some of the tanks will be being filled, and the contents aerated, while in another or others precipitation and gradual discharge will be taking place; but directly a tank is full, the aeration will be stopped, and this is adapted to be effected automatically, say by an auto-gear, such as a floater and valve and cylinder gear actuating the air supply, or air and liquid supply; and this gear may also operate the purified liquid discharge valve or means so as to carry it off. And so on in sequence, the automatic air and liquid supply, and the liquid discharge means, would be operated at periods required, and quiescent periods in sequence automatically produced.

In some cases, the aeration may go on but will be stopped say half an hour after filling; and the closing of air valve may be delayed by a suitable device.

As a modified mode of accomplishing this automatic sequential operation of controlling the supply of liquid and air to the tanks, the carrying off of the supply of the liquid and other operations may be accomplished by a species of water clock or other time piece may be employed, which at one hour intervals or other periodic times, will cause through pneumatic cylinders and pistons or like gear, or electric motors, the various actuations of valves or the like so that the cycles of actions referred to of the tanks, and their performances in sequence, will take place.

An illustration of a table of sequences of the method referred to, in which a series of tanks operate in sequence, is as follows:—

1. The completion of filling of the first tank causes the air and liquid supplied to it to be shut off to itself, and opens the outlet or discharge means of the sixth (6) tank in series, and also opens air and liquid to the fifth (5).

2. The completion of filling of the second tank causes the air and liquid supplied to it to be shut off to itself, and opens the supply of air and liquid to the sixth (6) tank, and opens the discharging or outlet to the first (1) tank.

3. The completion of filling of the third tank causes the air and liquid supplied to itself to be shut off, and opens the supply of air and liquid to the first tank, and opens the discharge or outlet of the second tank.

4. The completion of filling of the fourth tank causes the air and liquid supplied to it to be shut off to itself, and opens the supply of air and liquid to the second tank, and causes the discharge or outlet of the third tank to take place.

5. The completion of filling of the fifth tank, causes the air and liquid supplied to it to be shut off to itself, and causes a supply of air and sewage to take place to the third tank, and effects the operation or opening of the discharge of the fourth tank.

6. The completion of the filling of the sixth tank, causes the air and liquid supplied to it to be shut off to itself, causes the opening of the air and sewage supplied to the fourth tank, and effects the commencement of discharge or opening of the outlet to fifth tank.

If the flow is variable, the various actuations of fluid supply and discharge mechanism may be effected through a time piece.

Figure 4:
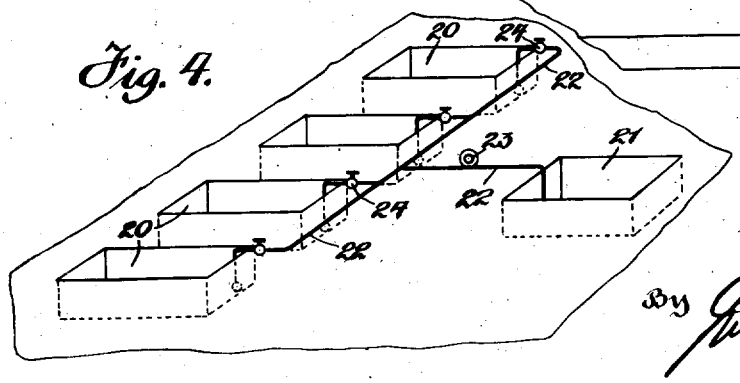
Figure 2:
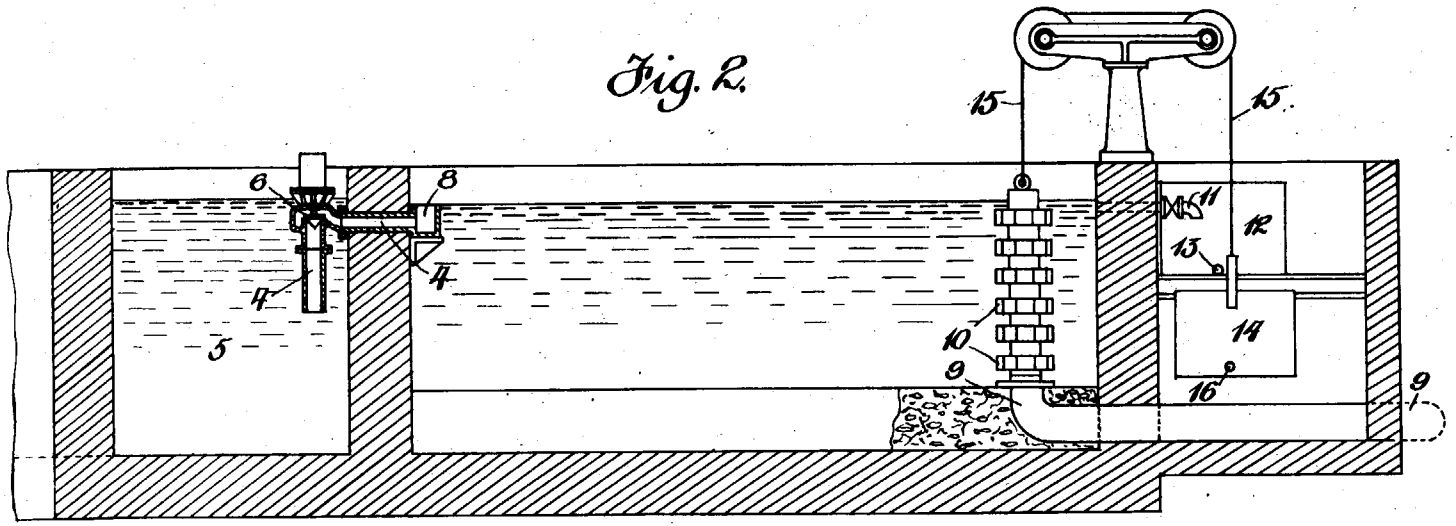
Figure 3:
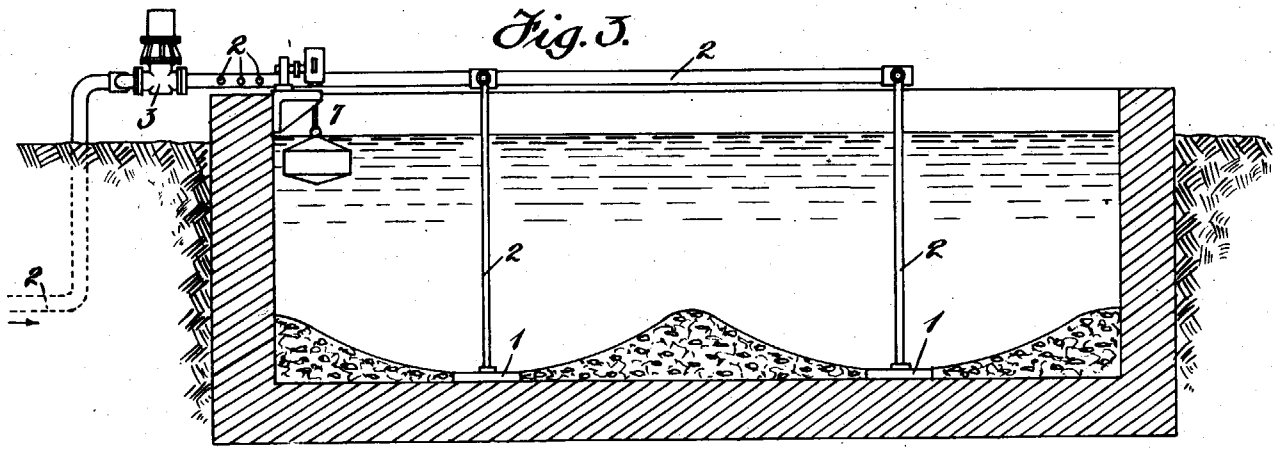

An arrangement of a plurality of tanks adapted to operate in sequence, as above described, (in which however three tanks instead of six are employed) is illustrated in the accompanying drawings, in which Figure 1 is a plan; Fig. 2 is a longitudinal section; Fig. 3 is a cross section; and Fig. 4 is a diagrammatic view of a sludge recuperating device.

In this drawing 1 are the air supplying means or diffusers at the bottom of the tank; 2 are the pipes for supplying them with air; 3 the valves on the separate air pipes leading to the separate tanks, by which the supply and cut-off air at the required times as described, is effected, and 4 are the liquid supply pipes to the tanks, from a common well 5, having pneumatically operated valves 6 upon them for closing and opening the supply of liquid at the required times.

7 represents a float actuated valvular device connected with each tank, which will be operated when the liquid in the tank reaches the full level, and when it recedes from this level in emptying; and this valve device will actuate the air and water valves 3 in any known suitable way, so as to carry out the sequential operations above specified.

The discharge means or valves of the tank are designated 10, and they are opened and closed by a species of water clock namely liquid from the tank when nearly full passes by a tap 11 into the cistern 12, and thence by a regulating tap 13 in the bottom of same it flows in a regulated quantity into the bucket 14, carried by a chain or cord 15 connected with the discharge valves 10, so that when the bucket 14 is filled to a certain extent from the cistern 12, the valves 10 are opened by the weight of liquid, and the liquid from tank is discharged from its upper level.

The tap 16 is so regulated that, while the bucket will fill from the cistern 12, it will gradually empty itself in the time allotted.

The crude sewage is distributed to the tanks by a distributing trough 8 at the head of each tank, from which it overflows into the tank.

The purified effluent is discharged from the tanks through the discharge pipes 9, on which the discharge controlling valves 10 are placed.

The float device 7 has on it, a pilot valve arrangement, such as is commonly used in connection with pneumatic sewage ejectors or pumping apparatus or pneumatic liquid lifts, for controlling the supply of air to and from the main valves for controlling the supply, and discontinuing the supply of both air and liquid.

Instead of the above method, two pilot valves on the same spindle operated by one float may be used, so that the air will not be cut off when the tank is full, but when the next tank in series is partly filled.

This would also be arranged to control the operation of the discharge valves 10; and in this arrangement also, a suitable means for delaying water flowing into the first cistern 12 until aeration is over will be used; or the tap 11 supplying the cistern may be arranged so as to take a longer time in filling the cistern; but the former method is better, as the sewage supply flow will be a varied one, and the length of aeration will also vary.

One of the chief objects and effects of the gradual and continuous supply of liquid and filling of the tanks, is to promote the supply of average quality of sewage to the plant, so that the constitution and quality of the sludge life or active principle in the treatment, is not so much affected deleteriously by sudden flows of relatively large proportion of disinfectant matter or trade waste which sometimes occur, and which act deleteriously on the active qualities and characteristics of the sludge life.

In cases where the sewage or liquid to be treated contains disinfectant matter or matters which deteriorate the activity of the sludge life or its active principle, there may be combined with the treating and purifying tanks another tank or tanks, connected with same by pipes or conduits, and liquid forcing means for transferring fluids from one to the other and to this other tank or tanks, sludge which has become deteriorated—say from causes such as referred to—can be forced and transferred from one or more of the purifying tanks; and this separate tank or tanks will have connected with it air supply means similarly as in the purifying tanks; and the debilitated sludge life will be recuperated or regenerated as regards its active principle, and restored to its full intensity or strength by acting on the sludge with air, similarly as on the sewage in the purifying tanks, until it is brought up to the required condition. Thus any tank or vessel containing deteriorated sludge can have the sludge transferred from it to a recuperating or hospital tank; and the affected purifying tank supplied from a recuperating or hospital tank with recuperated sludge; and the process, in spite of having set backs due to causes such as referred to, may be rendered continuous at practically the maximum rate of purification. A diagrammatic drawing illustrating this method of operating upon the sewage and sludge is given in Fig. 4 in which there is used in connection with a plurality of sewage purifying or treatment tanks 20 a sludge recuperating or hospital tank 21. The sludge is forced from and to any of the tanks 20 by a pump 23 on a system of pipes 22 extending between the tanks 20 and the tank 21; the sections of the piping 22 connecting with the respective tanks 20 having a controlling valve 24 upon same, so as to put any of the tanks 20 into communication with the tank 21, and so that the sludge can be forced from same into tank 21, or back from the latter after recuperation, into the tank or tanks 20, as required.

With regard to the mode of operating the tanks in sequence as above described, in the case of the application of the process to small purification plants, it is important that the sequential mode of operating described should be automatic, so as to avoid cost of attendants to operate the plant; and the power means or mechanism employed for effecting the actuations of the valves, penstocks or parts used in the control and operation of the system may advantageously be pneumatic, so that the compressed air for actuating it, as well as that used for aerating and energizing the sludge life will be furnished by the same machinery or from the same source. But where electricity is used on a plant, this power may be employed.

In the case of existing plants, having filter beds, the process herein described may be applied to the purification of the sewage for the dry weather or medium weather day flow, whereas the night flow, and also the surplus storm flow, may be treated by the existing method and arrangement.

According to this invention, in the treatment and purification of sewage and other analogous foul liquids by the process wherein the purifying effect is due to the action of the sludge life or aerobic bacteria and other similar forms of germ life, the active principle of the sludge is kept at a high degree, by working with a sludge containing or diluted with a relatively large proportion of water (which will preferably be the purified liquid in the sewage) and this condition is produced and maintained by supplying the raw or crude sewage to a tank containing the dilute sludge, gradually and continuously, and causing it to be acted upon by air as it is supplied into it.

This arrangement of plant and mode of carrying out the process may be applied to a continuous supply and discharge tank system, as well as to the gradual filling method, as in the latter case where the tank is gradually filling, and then emptied, the contents of the tank by the constant supply of air from the first introduction of liquid, keep it more and more diluted; and when the tank is nearly full, the liquid portion of the contents will be nearly all water. This sludge life or active principle in such cases, is not subjected to the introduction upon or into it of large volumes of raw or crude sewage, which is liable from its nature, to debilitate it, and render its purifying powers of less effect, and so slowing down the whole process. In other words as the liquid under treatment receives crude sewage in small quantities or doses, the sludge life will always have an environment of dilute impurity sewage or liquid (and air), and this tends to its retaining its undiminished purifying action and effect.

An organism of a type which is serviceable in connection with the method of purification of sewage or other liquids herein described, is one that in the pressure of a certain quantity of iron salts in the sewage or liquid has the power of rapid purification or clarification.

Organisms of this kind are known, and a small proportion of iron salts in the sewage or liquid constitute a powerful and rapid purifying medium.

What is claimed is:—

1. The process of purifying sewage or analogous liquids consisting in gradually supplying the crude sewage to a body of bacterial sludge or solid matter, aerating or oxidizing it while so being supplied.

2. The process of purifying sewage or analogous liquids consisting in gradually supplying the crude sewage to a body of bacterial sludge or solid matter, aerating or oxidizing it while so being supplied, then allowing the liquid to remain quiescent for about one to three hours and depositing the sludge, and subsequently removing the purified effluent, and leaving the sludge or solid matter.

3. The process of purifying sewage or analogous liquids, consisting in gradually supplying the crude sewage to a body of bacterial sludge or solid matter, aerating or oxidizing it while so being supplied, then allowing the liquid to remain quiescent, and gradually drawing off the purified liquid from near the surface, and leaving the sludge or solid matters.

4. The process of purifying sewage or analogous liquids, and preventing deterioration by sudden flows of relatively large proportions of disinfectant matter or trade waste, consisting in supplying a plurality of separate quantities of sewage or analogous liquid at the one time to a series of tanks; aerating or oxidizing said plurality of separate quantities of liquid at one time, and carrying off the purified liquid from said tanks in sequence.

5. The process of purifying sewage or analogous liquids, which consists in aerating or oxidizing a plurality of quantities of liquid, in the presence of bacterial sludge, depositing sludge or solid matters therefrom, transferring the sludge in which the bacteria have deteriorated or weakened to tanks, aerating or oxidizing the removed and debilitated sludge and so recuperating it; and transferring the recuperated sludge to one or more of the bodies of liquid being treated.

6. The process of purifying sewage or analogous liquids, which consists in supplying raw or crude sewage to a quantity of bacterial sludge or solid matter and liquid being treated, gradually and continuously, and supplying air to same and acting upon it by said air as the raw or crude sewage is supplied, whereby the bacterial sludge retained and employed, to which the crude sewage is delivered, and which it mixes with, is diluted with and contains a relatively large proportion of water; substantially as described.

7. The purification of sewage or other impure liquids in which the liquid is treated or acted upon by bacterial sludge, separating sludge from the treated liquid, aerating such separated sludge for increasing the efficiency or activity of same; and returning such sludge to raw sewage or impure liquid which is being treated or purified.

8. The method of purifying sewage and other impure liquids by the activated sludge process, by separating the sludge from the sewage or liquid which has been treated, aerating such sludge so separated for increasing the activity and efficiency of the bacteria of the sludge, and treating fresh sewage or liquid with such re-invigorated sludge.

9. The method of purifying sewage or other impure liquids by the activated sludge process, by aerating raw sewage or liquid containing a substantial proportion of activated sludge; removing such liquid so treated; separating the sludge from the liquid; aerating the sludge so separated; and passing such sludge so revivified or intensified to fresh sewage being aerated and purified, said operations constituting a practically continuous process.

10. The improvement in the activated sludge method of treatment as applied to sewage, which consists in drawing off the activated sludge from previously treated sewage, aerating such sludge after its withdrawal to enhance the virility of aerobic organisms therein, and inoculating the raw sewage with such re-vitalized sludge.

WALTER JONES.

Witnesses:

ARTHUR BUTWELL,

HARRY BIRCH KILLOU.